United States Patent
Yamada et al.

(10) Patent No.: US 7,420,594 B2
(45) Date of Patent: Sep. 2, 2008

(54) IMAGE PROCESSING APPARATUS WITH IMAGE SENSING CAPABILITY AND STORAGE MEDIUM STORING AN IMAGE PROCESSING PROGRAM

(75) Inventors: Yoichi Yamada, Kyoto (JP); Tsutomu Araki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 641 days.

(21) Appl. No.: 11/084,776

(22) Filed: Mar. 21, 2005

(65) Prior Publication Data

US 2005/0219377 A1 Oct. 6, 2005

(30) Foreign Application Priority Data

Mar. 30, 2004 (JP) .............................. 2004-098424

(51) Int. Cl.
*H04N 5/228* (2006.01)

(52) U.S. Cl. .................................................. 348/222.1

(58) Field of Classification Search ............... 348/222.1
See application file for complete search history.

(56) References Cited

U.S. PATENT DOCUMENTS

| 4,276,570 A | 6/1981 | Burson et al. |
| 5,487,140 A | 1/1996 | Toya |
| 5,867,171 A | 2/1999 | Murata et al. |
| 5,890,120 A | 3/1999 | Haskell et al. |
| 6,137,903 A | 10/2000 | Dichter |
| 6,348,923 B2 | 2/2002 | Murata |
| 6,748,119 B1 * | 6/2004 | Bollman .................. 382/254 |
| 6,816,159 B2 * | 11/2004 | Solazzi .................... 345/419 |
| 2002/0030834 A1 | 3/2002 | Watanabe et al. |
| 2003/0234871 A1 | 12/2003 | Squilla et al. |

FOREIGN PATENT DOCUMENTS

| JP | 10-255066 | 9/1998 |
| JP | 2000-261650 | 9/2000 |
| JP | 2002-281326 | 9/2002 |
| JP | 2004-046793 | 2/2004 |

* cited by examiner

*Primary Examiner*—James M Hannett
(74) *Attorney, Agent, or Firm*—Nixon & Vanderhye P.C.

(57) ABSTRACT

An image processing apparatus includes an image sensing unit. After photographing of an image of a face, for example, a characteristic data selection menu is displayed for addition of a characteristic to the face image. The characteristic data selection menu offers a plurality of characteristics expressed by words, for example. A user selects by word(s) a characteristic to be added to the face image. The face image is modified on basis of an image modification pattern corresponding to the selected characteristic data. The image modification pattern data is set with a relative increasing/decreasing value with respect to color data (RGB) of each pixel of the face image. Then, displayed is a final face image which has been modified according to a plurality of image modification patterns corresponding to the plurality of selected characteristic data, for example.

10 Claims, 8 Drawing Sheets

IMAGE PROCESSING APPARATUS WITH IMAGE SENSING CAPABILITY AND STORAGE MEDIUM STORING AN IMAGE PROCESSING PROGRAM

FIELD

The illustrative embodiments relate to an image processing apparatus with image sensing capability and a storage medium storing an image processing program. More specifically, the illustrative embodiments relate to an image processing apparatus with image sensing capability and a storage medium storing an image processing program in which, after photographing of an image of a face, colors of the image are modified according to input from a user.

BACKGROUND AND SUMMARY

It is well known that an image of a face can be photographed by using a digital camera. Also, it is a common practice to adjust colors of a photographed image by means of a photo retouching software program, etc. or use the image for creation of another image on a personal computer.

Meanwhile, there exist various kinds of digital cameras equipped with the capability of automatically performing such image adjustments and apparatus for producing photographic prints.

Disclosed in a document 1 (Japanese Patent Laying-open No. H10-255066) is a method of modifying an image of a face for the purpose of producing a face image with makeup. By inputting a target indicating what kind of face is desired to be finally prepared by applying a makeup, a plurality of images are produced and displayed, from an image of an actually photographed face that is modified step-by-step toward the desired face.

A document 2 (Japanese Patent Laying-open No. 2002-281326) discloses an image photographing apparatus with the function of performing color correction for optimal skin tone in an identification photograph. A prescribed color conversion is performed on a photographed image, and it is determined whether or not the hues of the color-converted image fall within a prescribed color tone. If the hues are out of the prescribed color tone, the color conversion is automatically repeated to correct the colors of the image so that they falls within the prescribed color tone range.

A document 3 (Japanese Patent Laying-open No. 2000-261650) discloses an image processing apparatus in which, when photographing the upper body of a person, the brightness of the face image is corrected so as to be equal to a predetermined standard value.

Thus, in the documents 1 to 3, the color tone of image of a person's face is automatically adjusted to obtain a desired image of the face which is modified or made up, or an image with skin color or of brightness best suited for an identification photograph.

Meanwhile, a document 4 (Japanese Patent Laying-open No. 2004-46793) discloses an image processing system which makes it possible to, by photographing a person's face and inputting some additional feature data, compose a virtual three-dimensional character to which a photographed image of the face is pasted and which has a body shape based on the feature data.

However, the color adjustment of an image with the use of a photo retouching software program requires technical knowledge of brightness and color tones and makes operations more complicated. In addition, the documents 1 to 3 concentrate attention on how a photographed face image can be adjusted automatically and accurately. Thus, they have no factor that makes it possible to modify the colors of a photographed face image in a simple, easy and amusing manner. Moreover, according to the documents 1 to 3, it is impossible to modify a photographed image of a face having some features to another image of a face having absolutely different features in a simple and easy way.

Meanwhile, according to document 4, a three-dimensional character containing a photographed face image is produced by photographing a person's face and inputting related feature data. This makes it possible to create a character of unexpected body shape based on the input related characteristics data, but does not modify the face image in such a manner as to match the body shape.

One illustrative embodiment provides an image processing apparatus with image sensing capability and a storage medium storing an image processing program, which makes it possible to modify colors of a photographed image in a simple and easy manner just by photographing an image and inputting a characteristic to be added to the image.

Another illustrative embodiment provides an image processing apparatus with image sensing capability and a storage medium storing an image processing program, which makes it possible to modify colors of a photographed image of a face in a simple and easy manner just by photographing an image of a face and inputting a characteristic to be added to the face image.

A further illustrative embodiment provides an image processing apparatus with image sensing capability and a storage medium storing an image processing program, which makes it possible to enjoy variations of an image by changing colors of the image according to an input characteristic.

Another illustrative embodiment provides an image processing apparatus with image sensing capability and a storage medium storing an image processing program This makes it possible to change colors of an image in a very simple and easy manner just by selecting characteristic data prepared in advance.

An image processing apparatus with image sensing capability according to an illustrative embodiment comprises an operating means, an image sensing means, a display means, an image-sensed data temporary storage means, a still image storage means, a photographing means, a characteristic input means, an image modification pattern storage means, an image modification pattern selection means, an image modification means, and a modified image display means. The operating means is intended for a user to perform operation input. The image sensing means includes an image sensing device and is intended to photograph an image. The display means displays at least the image photographed by the image sensing means. The image-sensed data temporary storage means temporarily stores image-sensed data input from the image sensing means. The still image storage means stores as a still image the image-sensed data input from the image sensing means. The photographing means stores in the still image storage means the image-sensed data stored in the image-sensed data temporary storage means when prescribed operation input is performed from the operating means. The characteristic input means makes a user, corresponding to the still image stored by the photographing means, input at least one characteristic related to the still image. The image modification pattern storage means stores a plurality of image modification pattern data containing a change amount associated with each pixel of the still image stored by the photographing means and for modifying color data of the pixel. The image modification pattern selection means selects at least one image modification pattern data corresponding to at least the one characteristic input by the characteristic input means. The image modification means modifies color data of the still image stored in the still image storage means based on at least the one image modification pattern data selected by the image modification pattern selection means. The modified image display means displays on the display means the still image modified by the image modification means.

More specifically, an image processing apparatus with image sensing capability (10: reference numeral. The same is applied to the following numerals.) includes an operating means (20) for a user (100) to perform operation input. An image sensing means (30) includes an image sensing device and is intended to photograph an image. A display means (18) displays at least an image photographed by the image sensing means. An image-sensed data temporary storage means (86, S3) stores image-sensed data input from the image sensing means. A still image storage means (96) stores as a still image the image-sensed data input from the image sensing means. A photographing means (32, 68, S7, S9) stores in the still image storage means the image-sensed data stored in the image-sensed data temporary storage means when prescribed operation input is performed from the operating means. A characteristic input means (32, 76, 106, S13, S15, S23) makes the user, corresponding to the still image stored by the photographing means, input at least one characteristic related to the still image. An image modification pattern storage means (94) stores a plurality of image modification pattern data containing a change amount associated with each pixel of the still image stored by the photographing means and for modifying color data of the pixel. An image modification pattern selection means (32, 78, S17) selects at least one image modification pattern data corresponding to at least one characteristic input by the characteristic input means. An image modification means (32, 80, S19) modifies color data of the still image stored in the still image storage means based on at least one image modification pattern data selected by the image modification pattern selection means. A modified image display means (32, 38, 46, 82, S25) displays on the display means a still image (114) modified by the image modification means.

Thus, by making the user input a characteristic, color of a photographed image of a face, for example, is modified on the basis of an image modification pattern corresponding to the characteristic, which makes it possible to modify the image with addition of the characteristic in a simple and easy manner. Also, since a modified image of the face, for example, is displayed, it is possible to have fun seeing how the image has been modified by the input characteristic.

An illustrative embodiment may further include a characteristic data storage means (90) for storing a plurality of characteristic data related to the characteristic in advance. The characteristic input means makes the user select a plurality of characteristic data from the characteristic data stored in the characteristic data storage means. The image modification pattern selection means selects a plurality of image modification pattern data corresponding to the plurality of characteristic data selected by the characteristic input means. The image modification means modifies color data of the still image based on the plurality of image modification pattern data selected by the image modification pattern selection means. The modified image display means displays a final still image modified by the image modification means based on all the plurality of image modification pattern data.

Therefore, since the characteristic data are prepared in advance and the user can modify the colors of a photographed image of a face, for example, just by selecting such characteristic data, it is possible to modify the image in a simpler and easier manner. Also, prior preparation of the characteristic data allows the user to select some unexpected characteristic data, whereby realizing image processing of more entertaining nature. Additionally, a plurality of characteristic data are selected by the user and an image modified on the basis of all the plurality of corresponding image modification patterns is finally displayed. Thus, the final image may appear suddenly in a state to be subjected to greater-than-expected modifications with the plurality of characteristic data, resulting in enhancement of entertainment values.

In one illustrative embodiment, an exemplary image modification pattern storage means stores a plurality of image modification pattern data containing an increasing/decreasing value associated with all pixels of the still image and for relatively increasing or decreasing color data of the pixels, corresponding to all the plurality of characteristic data stored in the characteristic data storage means. Therefore, the image modification patterns defining a relatively increasing/decreasing amount of color data of each pixel are prepared in advance for each plurality of characteristic data, which makes it possible to modify an image only by performing a relative adding or subtracting operation on color data of each pixel. This makes available an image modification capability with less processing burden.

In another illustrative embodiment, an exemplary characteristic input means makes the user select the characteristic data using a word expressive of the characteristic. Consequently, a characteristic to be added to a photographed image of a face, for example, is supposed to be selected by a word or an expression describing the characteristic, and the user thus cannot know how the image will be specifically modified at a time of selection. Therefore, the user can experience effects of the plurality of selected characteristics only after seeing the displayed final image. This improves amusing and entertaining properties of image modification with addition of characteristics.

A storage medium storing an image processing program according to an illustrative embodiment is a storage medium storing an image processing program for performing image processing in an image processing apparatus which comprises at least an operating means for a user to perform operation input, an image sensing means including an image sensing device for photographing an image, a display means for displaying the image photographed by the image sensing means, a program processing means, an image data storage means, and an image modification pattern storage means for storing a plurality of image modification pattern data containing a change amount associated with each pixel of data of the image photographed by the image sensing means for modifying color data of the pixel. This image processing program causes a processor of the image processing apparatus to execute an image-sensed data temporary storage step, a photographing step, a characteristic input step, an image modification pattern selection step, an image modification step, and a modified image display step. The image-sensed data temporary storage step temporarily stores image-sensed data input from the image sensing means in the image data storage means. The photographing step stores as a still image the image-sensed data stored by the image-sensed data temporary storage step, in another area of the image data storage means when prescribed operation input is performed from the operating means. The characteristic input step makes the user, corresponding to the still image stored by the photographing step, input at least one characteristic related to the still image. The image modification pattern selection step selects at least the one image modification pattern data corresponding to at least one characteristic input by the characteristic input step. The image modification step modifies color data of the still image stored in the image data storage means, based on at least the one image modification pattern data selected by the image modification pattern selection step. The modified image display step displays on the display means the still image modified by the image modification step.

The storage medium storing the image processing program makes it possible to modify a photographed image of a face, for example, in a simple and easy manner as well as the above described image processing apparatus with image sensing capability.

The input of characteristic data modifies colors of a photographed image of a face, for example, based on the image modification pattern corresponding to the data. This allows an image to be modified in a simple and easy manner with addition of characteristic(s). Moreover, since the modified image is displayed, it is possible to have fun seeing how the photographed image is modified by the input characteristics.

The above described aspects the illustrative embodiments will become more apparent from the following detailed description of the illustrative embodiments when taken in conjunction with the accompanying drawings.

DETAILED DESCRIPTION OF THE ILLUSTRATIVE EMBODIMENTS

Figure 1:
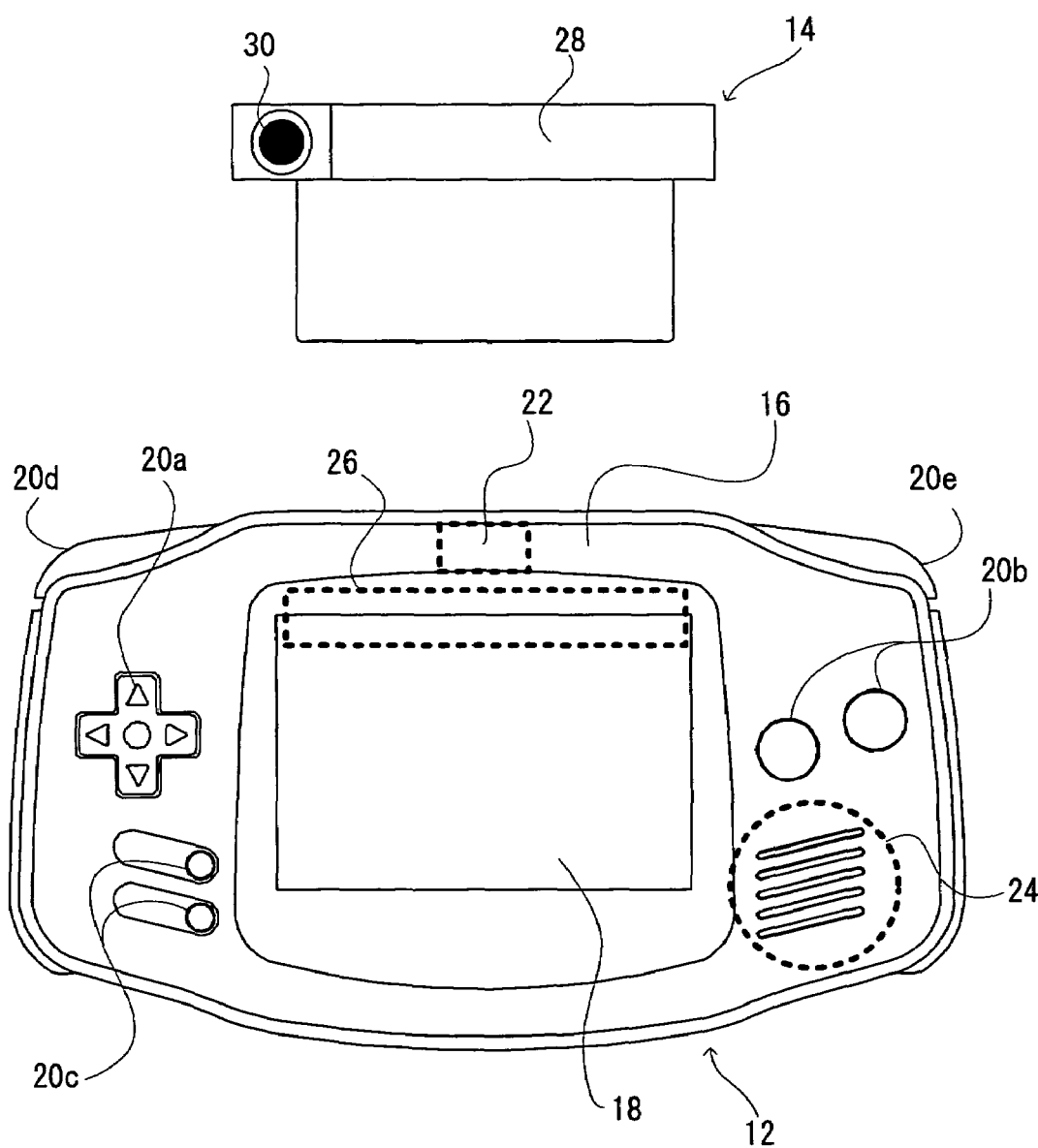
FIG. 1 is an outline view showing one example of an image processing apparatus with image sensing capability.

An exemplary image processing apparatus 10 shown in FIG. 1 is equipped with an image sensing capability allowing it to photographing an image, such as an image of a face, for example, and is realized in a form of an exemplary game apparatus. The image processing apparatus with image sensing capability, i.e., the game apparatus 10 includes a game machine 12 and a camera cartridge 14 attached to the game machine 12.

The exemplary game machine 12 is a hand-held type game machine capable of being held with both hands, and using the machine it is possible to enjoy various games by changing a cartridge which is an attachable/detachable external storage medium storing a game program and data. A camera cartridge 14 with electronic image sensing capability is one such cartridge. The game machine 12 includes a housing 16, for example. One main surface (front side) of the housing 16 is provided with a liquid crystal display 18 (hereinafter abbreviated as "LCD"), as an example of an image display means, in an approximate center thereof, and is also provided with various operating switches 20, as an operating means, on right and left sides of the LCD 18.

The operating switches 20 include a direction switch 20a, an action switch 20b, a start/select button 20c, an L button 20d provided on a left corner of the housing 16, and an R button 20e provided on a right corner of the housing 16, for example. The direction switch 20a is used to specify a moving direction of a character (not illustrated) when operating the character during a game and to move a cursor for selection of an option item, for example. The action switch 20b is used to specify an action of a character (e.g. making a jump) and to determine/cancel a selection of an option item, for example. The L button 20d is used as a shutter button or the like at a time of photograph shooting. The R button 20e is used for other photographic operations (e.g. cancellation of photograph shooting). The start/select button 20c is used to start a game or stop a game operation. Since game details processed by the game apparatus 10 and data of an image photographed by a camera appear on the LCD 18, a user or an operator can enjoy game images and photographic images shot by a camera which are displayed on the LCD 18, by operating such various operating switches 20 as mentioned above.

Figure 2:
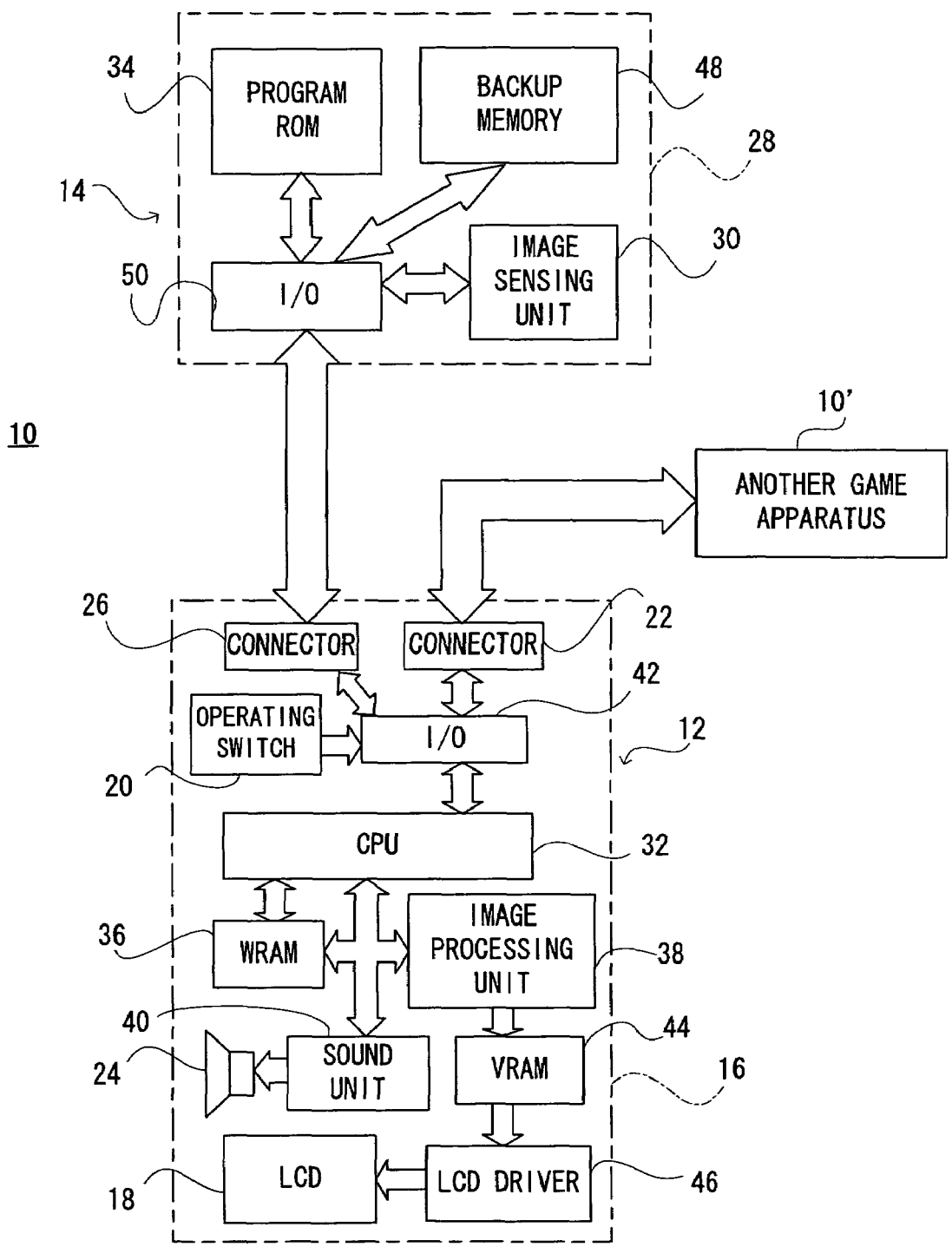
FIG. 2 is a block diagram showing one example of an internal structure of the FIG. 1 exemplary illustrative embodiment.

The game machine 12 is also provided with a connector 22 on an upper side thereof as necessary. As shown in FIG. 2, the connector 22 is used to enjoy a communication game in connection with another game apparatus 10' (or another game machine 12') and to transmit/receive data of game details processed by the game machine 12 and data of images photographed by a camera or the like to/from the other game apparatus 10'. Additionally, a speaker 24 is included on an inside of a sound release hole provided on a surface of the housing 16, which outputs audio contents such as BGM and sound effects during a game.

The camera cartridge 14 includes a housing 28 capable of being attached to and detached from the game machine 12 via a connector 26 provided on a rear side of the housing 16, and an image sensing unit 30. In addition, when the camera cartridge 14 is attached to and connected with the game machine 12 via the connector 26, the game machine 12 functions as a game apparatus with image sensing capability.

FIG. 2 is a block diagram of the game apparatus 10 to which the game machine 12 and the camera cartridge 14 are connected. Referring to FIG. 2, the game machine 12 includes a CPU 32. The CPU 32 is also called a processor or computer, and performs game processing, photographic processing, image processing, etc., according to programs of a program ROM 34 contained in the camera cartridge 14. The CPU 32 is connected with a working RAM (hereinafter abbreviated as "WRAM") 36, an image processing unit 38, a sound unit 40, an input/output interface (hereinafter abbreviated as "I/O") 42, etc.

The WRAM 36 is used as a working area or buffer area for the CPU 32. The WRAM 36 loads data required by the CPU 32 for game processing or stores data generated during game processing in an updating manner. The image processing unit 38 is connected with a video RAM (hereinafter abbreviated as "VRAM") 44. The image processing unit 38, under instructions from the CPU 32, generates image data for display based on data temporarily stored in the WRAM 36. The VRAM 44 temporarily stores the image data to be used for display generated by the image processing unit 38. The image data stored in the VRAM 44 is displayed on the LCD 18 via an LCD driver 46. The sound unit 40 converts sound data generated in relation to game processing or the like of the CPU 32 into an analog signal, and outputs the signal as music or sound effects from the speaker 24.

The I/O 42 connects the CPU 32 with the operating switches 20, the connector 26 (the camera cartridge 14), and the connector 22 (the other game apparatus 10'). The CPU 32 detects operation input data from the operating switch 20 via the I/O 42 and uses it for program processing. The CPU 32 also controls the camera cartridge 14 via the I/O 42. Moreover, the CPU 32 transmits/receives data to/from the other game apparatus 10' via the connector 22 connected to the I/O 42.

The camera cartridge 14 comprises the image sensing unit 30, the program ROM 34, a backup memory 48, etc. inside the housing 28 thereof, which are connected to a cartridge input/output interface (hereinafter abbreviated as "cartridge I/O") 50. The image sensing unit 30 includes an electronic photosensitive device as an image sensing device, such as a CMOS sensor or CCD, and outputs light information obtained by light exposure (color information or luminance information) in a form of digital data. The program ROM 34 fixedly stores programs and data for making the game apparatus 10 function as an image processing apparatus. The backup memory 48 is a writable/readable memory for storing information on a game still in progress, data of images photographed by the image sensing unit 30, etc. As such a memory, a flash memory which is a nonvolatile memory, an SRAM powered by batteries, etc. can be used, for example. When the camera cartridge 14 is attached to the game machine 12, the cartridge I/O 50 is connected with the CPU 32 via the connector 26 and the I/O 42. With this, the CPU 32 can access the image sensing unit 30, the program ROM 34 and the backup memory 48 via the cartridge I/O 50 to control the camera cartridge 14 or swap data with the camera cartridge 14.

Additionally, although the separate game machine 12 and camera cartridge 14 are connected to each other, they may be integrally formed, that is, the image sensing unit 30, the program ROM 34 and the backup memory 48 may be contained in the game machine 12.

As stated above, by attaching the camera cartridge 14 to the hand-held type game machine 12 integrally provided with the LCD 18, it becomes possible to instantly display a photographed image on the display screen (LCD 18), which allows an object to be photographed in a manner similar to a case of using an electronic camera or a digital camera.

In addition, although description is given here only as to the game machine 12 with which the LCD 18 is integrally formed, it may be possible to add same functions to a video game console that is connected to a home TV set (CRT). In such a case, if the game machine 12 is a video game console, it may be possible to provide the operating switches 20 to a game controller that is separated from the video game console, instead of forming them integrally with the housing 16.

Figure 3:
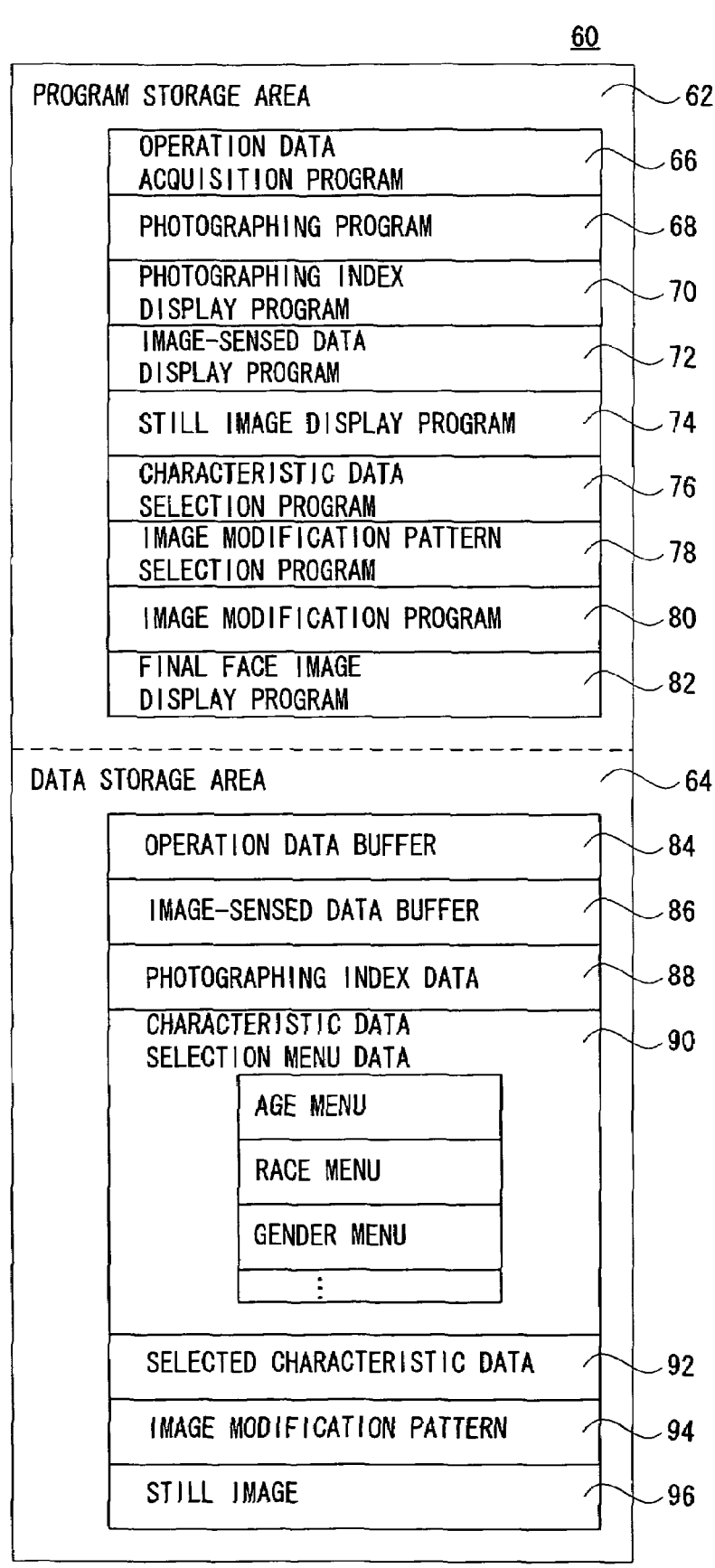
FIG. 3 is an illustrative view showing one example of a memory map of a WRAM in FIG. 2.

FIG. 3 shows one example of a memory map 60 of the WRAM 36 in case where the game apparatus 10 functions as an image processing apparatus. The memory map 60 can be roughly divided into a program storage area 62 and a data storage area 64. The program storage area 62 stores various programs that are to be executed by the CPU 32 and make the game machine 12 function as an image processing apparatus. The data storage area 64 stores various data to be used by the programs stored in the program storage area 62. The data storage area 64 is also an area for temporarily storing data generated or obtained through program processing.

In addition, the memory map 60 is described above as a memory map of the WRAM 36. Nevertheless, if the ROM 34 fixedly storing programs can be connected directly to the CPU 32 as is the case with the game apparatus 10, for example, it is not necessary to transfer programs and data to the WRAM 36 for data retention. This is because, in this case, some portions of the program storage area 62 and data storage area 64 can be fixedly stored in the ROM 34, which allows the CPU 32 to access directly the ROM 34. However, if such a form is adopted, it is required to fixedly store only read-only data in the ROM 34 because the ROM 34 is not writable.

The program storage area 62 includes an operation data acquisition program storage area 66, a photographing program storage area 68, a photographing index display program storage area 70, an image-sensed data display program storage area 72, a still image display program storage area 74, a characteristic data selection program storage area 76, an image modification pattern selection program storage area 78, an image modification program storage area 80, a final face image display program storage area 82, etc.

The operation data acquisition program storage area 66 stores a program for acquiring data corresponding to operation of the operating switch 20 by the user 100 (operation input data) and temporarily storing the data in an operation data buffer area 84.

The photographing program storage area 68 stores a program for acquiring image-sensed data input from the image sensing unit 30 and temporarily storing the data in an image-sensed data buffer area 86. The program also allows the image data fetched in the image-sensed data buffer area 86 to be stored as a still image in a still image storage area 96 when the user 100 performs a shutter operation by pressing the L button 20*d* or the like.

Figure 4:
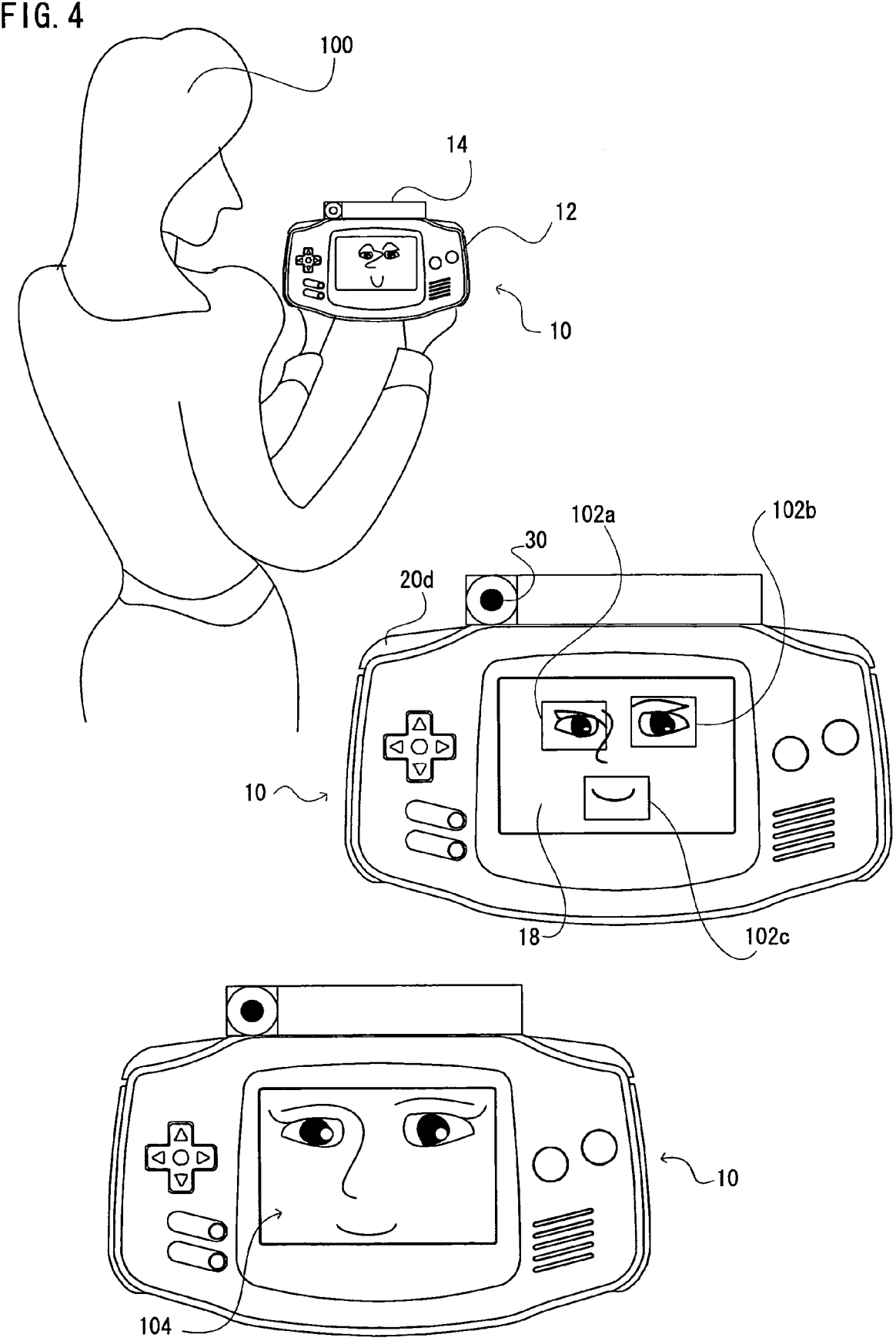
FIG. 4 is an illustrative view showing an overview of a scene of photograph being taken using the FIG. 1 exemplary illustrative embodiment.

The photographing index display program storage area 70 stores a program for displaying a photographing index on the LCD 18. The photographing indexes 102*a*, 102*b* and 102*c*, as shown in FIG. 4, are photographing guides that indicate positions of prescribed parts of a face of an object at a time of photographing a face image, and are displayed at prescribed positions on the LCD 18. Also, the photographing indexes may be collectively expressed by a numeral "102". The user 100 can photograph an image in such a manner that the prescribed parts of the face of the object displayed on the LCD 18 are aligned with the photographing indexes 102, which makes it possible to photograph the face image best suited for later image modifications. As shown in FIG. 4, the photographing indexes 102 include a right eye index 102*a*, a left eye index 102*b* and a mouth index 102*c*, which indicate at least both eyes and mouth of the object, respectively, for example. Each index 102 is of respective prescribed size and appropriate shape (rectangle, oval, etc.) so as to surround both the eyes and the mouth. The user 100 adjusts a photographing position in such a manner that each part of the face falls within or matches a range of each corresponding photographing index 102. In this way, it is possible to photograph an image of the face in which the prescribed face parts (here a right eye, left eye and mouth) are arranged at prescribed positions.

The image-sensed data display program storage area 72 stores a program for displaying on the LCD 18 the image-sensed data temporarily stored by the photographing program in the image-sensed data buffer area 86.

The still image display program storage area 74 stores a program for displaying on the LCD 18 the still image photographed and stored in the still image storage area 96 under the photographing program. When photograph shooting is performed using the above mentioned photographing index 102, an actual photographed image 104 is displayed on the LCD 18 as shown in FIG. 4, for example.

The characteristic data selection program storage area 76 stores a program for selecting characteristic data for addition of specific characteristic(s) to the photographed image of the face based on operation input by the user 100. The selected characteristic data is temporarily stored in a selected characteristic data area 92.

Figure 5:
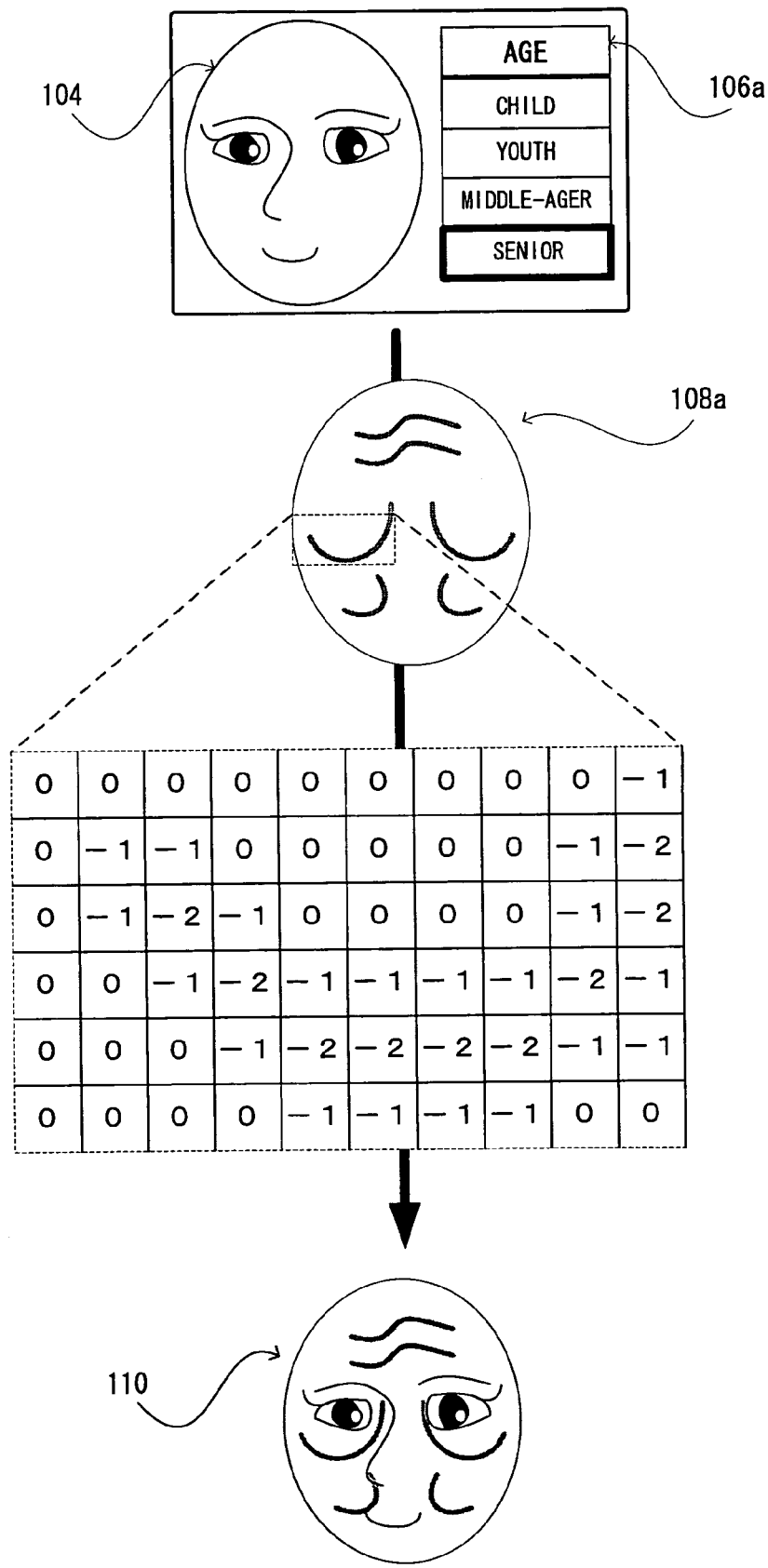
FIG. 5 is an illustrative view describing a process of adding a characteristic to an image photographed using the FIG. 1 exemplary illustrative embodiment and an outline of image modification pattern data.

A plurality of option items of characteristic data indicating human characteristics may be prepared in advance according to a plurality of categories or types. As shown in FIG. 5, the characteristic data is displayed in characteristic selection menus by type (hereinafter collectively expressed by a numeral "106"), and is selected by the operation of the user 100. In the characteristic data selection menu 106, each option item is represented by text which depicts some word(s) expressing the characteristic. Also, the LCD 18 displays the still image 104 of prescribed shape and size extracted from the actually photographed image, for example, as well as the characteristic data selection menu 106. The user 100 can therefore easily select a characteristic to be added to the still image 104, displayed concurrently with the characteristic data selection menu 106, using word(s). The kinds of characteristics to be prepared include age, race, gender, and body shape, for example. Presented in an example of FIG. 5 is a characteristic data selection menu for age 106a. The age menu 106a selectably lists a plurality of option items including Child, Youth, Middle-ager and Senior. In addition, a plurality of characteristic data selection menus 106 may be available, which allows the user 100 to add a plurality of characteristics by selecting one characteristic for each of the plurality of types.

The image modification pattern selection program storage area 78 stores a program for selecting an image modification pattern based on the selected characteristic data. The image modification pattern data is stored in an image modification pattern area 94 corresponding to a plurality of characteristic data, as data peculiar to each characteristic. The image modification pattern is data for modification of data of the photographed face image 104, and is the same in shape as the photographed face image 104, for example, has the same number of pixels as that of the data of the face image, and contains a change amount associated with each pixel of the face image 104 and for modifying color data of the pixel. That is, the image modification pattern data is provided with a relative change amount (increasing/decreasing value) with respect to color data (each component of R, G and B) of each pixel of image data of the still image 104.

A middle portion of FIG. 5 shows one example of an outline of an image modification pattern. An image modification pattern 108a is an illustration which conceptually shows an image modification pattern corresponding to the characteristic of the senior in the age menu 106a. Incidentally, the image modification patterns may be collectively expressed by a numeral "108". According to the image modification pattern 108a of the senior, the face image is modified in color tone for addition of an average or typical senior person's features in such a manner that some prescribed parts of the face such as forehead, under-eye areas, and cheeks are plowed with wrinkles. In the middle of FIG. 5, schematically shown under the conceptual illustration of the image modification pattern 108a are contents of the actual image modification pattern data in a rectangular box surrounded by dotted lines. As can be understood from FIG. 5, wrinkles in the image modification pattern 108a for the senior are set by increasing/decreasing values that indicate the change amount of color data for each pixel, that is, how much the color data should be increased or decreased. For example, if the change amount is "−1", the R, G and B values of the pixel are all evenly decreased by 1, resulting in a drop in brightness of the pixel. Also, if the modification amount is "+2", for example, the R, G and B values of the pixel are all evenly increased by "2", which raises the brightness of the pixel. Incidentally, the values of R, G and B are each presented within a range of 0 to 255.

The image modification pattern is set so as to be a pattern of color change amounts with which the characteristic can be successfully expressed. Some examples of pattern settings are listed below. In case of Female, for instance, such a pattern is conceivable where some colors are added on the whole for a fairer complexion. Also, in case of Youth, it may be possible to prepare such a pattern where the face looks more resilient, that is, the face becomes less sharply-chiseled by raising the values of colors of parts corresponding to the nose and the eye areas. In addition, in case of Fat, such a pattern may be possible where the face becomes shinier by increasing the values of colors of areas around the cheeks and forehead.

The image modification program storage area 80 stores a program for modifying data of the face image based on the selected image modification pattern. With this program, the change amounts (increasing/decreasing values) set to the pixels corresponding to the image modification pattern, are applied to the color data of all the pixels of the face image, as stated above. This generates data of a face image 110 in which the colors are modified, that is, to which the characteristic is added, as shown in a lower portion of FIG. 5, for example. It is noted that the resulting modified image data is written into the still image area 96.

The final face image display program storage area 82 stores a program for displaying on the LCD 18 a final face image that has been modified according to all the image modification patterns corresponding to all the selected characteristic data. The data of the final face image is stored in the still image area 96, for example.

The data storage area 64 includes the operation data buffer area 84, the image-sensed data buffer area 86, the photographing index data area 88, a characteristic data selection menu data area 90, the selected characteristic data area 92, the image modification pattern area 94, the still image area 96, etc.

The operation data buffer area 84 temporarily stores operation input data from the operating switch 20, which is acquired or detected by the operation data acquisition program.

The image-sensed data buffer area 86 temporarily stores data of an image electronically photographed by the image sensing unit 30 according to the photographing program. The CPU 32 and the image processing unit 38 execute the image-sensed data display program to read out the data temporarily stored in this area and display it on the LCD 18.

The photographing index data area 88 stores image data and display position data of the photographing index 102. The CPU 32 and the image processing unit 38 execute the photographing index display program to display the photographing index on the LCD 18 based on the photographing index data.

Figure 6:
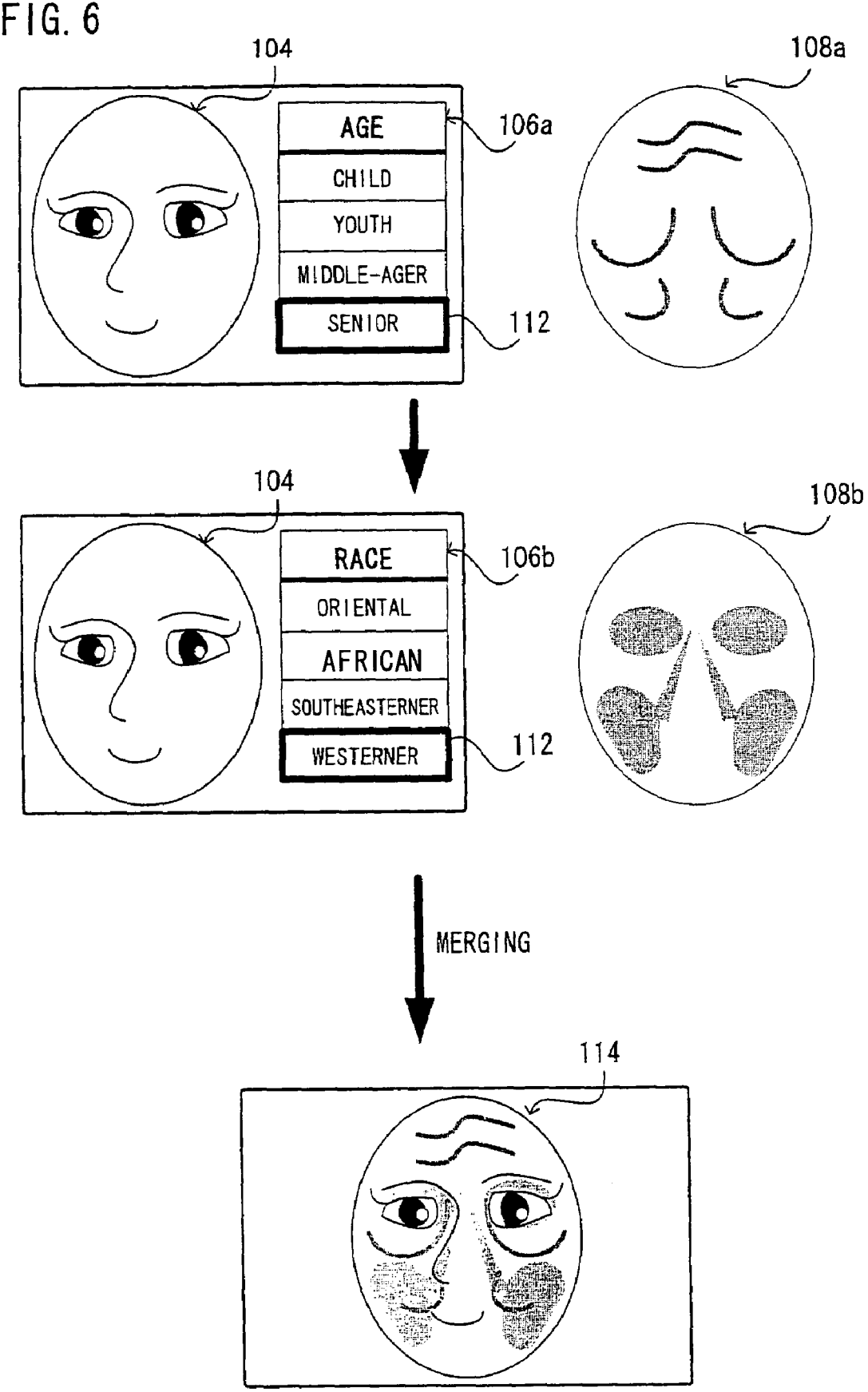
FIG. 6 is an illustrative view showing one example of an actual procedure for adding a characteristic to the image photographed using the FIG. 1 exemplary illustrative embodiment.

The characteristic data selection menu data area 90 stores data related to the characteristic data selection menu 106 that allows the user 100 to select characteristic(s) to be added to the face image. Based on the characteristic data selection menu data, the characteristic data selection menu 106 is displayed on the LCD 18. More specifically, a plurality of menus for selecting characteristics of such kinds as age, race, gender, body shape, etc. are stored. Each characteristic in each menu is displayed by text which depicts some word(s) expressing the characteristic. Incidentally, the characteristic may be represented in the menu by a design, etc. expressing the characteristic. The age menu 106a is provided with option items of Child, Youth, Middle-ager and Senior, for example, as shown in FIG. 5 or FIG. 6. The race menu 106b is set to have option items of Oriental, African, Southeasterner and Westerner, for example, as shown in FIG. 6. The gender menu is provided with option items of Male and Female.

The selected characteristic data area 92 temporarily stores characteristic data selected under operation of the user 100 according to the characteristic data selection program. If a plurality of characteristics are selected from a plurality of kinds of characteristics, all the selected characteristics are stored in this area.

The image modification pattern area 94 stores a plurality of image modification pattern data associated with the characteristic data. As stated above, the image modification pattern data is configured with a change amount or increasing/decreasing value of color data of each pixel of face image data. By execution of the image modification program, the data of the face image is modified on the basis of the image modification pattern data corresponding to the selected characteristic(s).

The still image area 96 stores image data of a still image photographed according to the photographing program. By execution of the still image display program, the still image is displayed on the LCD 18 on the basis of the image data of the still image. Also, a modification based on the image modification pattern is made to the image data of the still image read from the still image area 96 to another area of the WRAM 36. The modified image data is written into the still image area 96, for example. By execution of the final face image display program, the final face image is displayed on the basis of the data of the final face image in the still image area 96, as shown in a lower portion of FIG. 6, for example.

With this game apparatus 10, it is possible to photograph an object by using the above described camera cartridge 14 as in case with using an electronic camera or digital camera. Referring to FIG. 4, in order to shoot a photograph with use of the game apparatus 10, the user 100 holds the game apparatus 10 and directs the image sensing unit 30 provided in the camera cartridge 14 toward an object (the user 100 himself in FIG. 4). An image of face of the object fetched from the image sensing unit 30 is displayed in real time on a photographed image display area of the LCD 18. In an example of FIG. 4, the photographed image display area is provided in an entire screen of the LCD 18. During the photograph alignment, the photographing indexes 102 may be displayed at prescribed positions of the LCD 18, and the user 100 may adjust a position of the game apparatus 10 in such a manner that the right eye, left eye and mouth of the object displayed on the LCD 18 are aligned with the display positions of the right eye index 102a, the left eye index 102b and the mouth index 102c, respectively. In this way, it is possible to photograph an image of the face in which eyes, nose, mouth, etc. are arranged in a manner best suited for later addition of characteristic(s), that is, for image modification(s). Then, by a shutter operation with a press of the L button 20d, the image-sensed data is stored as still image data in the still image area 96 of the WRAM 36, and the photographed face image 104 is displayed on the LCD 18.

Also, the game apparatus 10 makes it possible to modify a photographed face image by adding at least one characteristic to the photographed face image. After photographing the face image, in adding characteristic(s), the characteristic data selection menu 106 is displayed on the LCD 18 together with the face image 104 that was actually photographed, as shown in FIG. 6. In an example of FIG. 6, the age menu 106a for selection of a characteristic related to age is displayed first, as shown in an upper portion. In the characteristic data selection menu 106, the user 100 points a cursor 112 to an option item showing a characteristic to be added by operating the direction switch 20a. The user 100 then selects the option item specified by the cursor 112 as a characteristic to be added to the image data, by operating the action switch 20b.

In the upper portion of FIG. 6, Senior is selected as a characteristic related to age. In this case, selection of Senior from the age menu 106a is recorded in the selected characteristic data area 92. Then, data of the image modification pattern for Senior 108a corresponding to the selected characteristic is selected and read out from the image modification pattern area 94. Based on the data of the image modification pattern for Senior 108a, the face image is subjected to image modification.

Also, since a plurality of characteristics may supposed be added, characteristic selection and image modification are continuously performed from the other characteristic selection menus 106. In the example of FIG. 6, a race menu 106b for selection of a characteristic related to race is displayed next as shown in a middle portion. Additionally, although a plurality of characteristics may be selected, individual results of image modifications due to the selected characteristics are not provided here, but the actual photographed still image 104 remains displayed on the LCD 18.

In the middle portion of FIG. 6, Westerner is selected as a characteristic related to race. In this case, selection of Westerner from the next race menu 106b is recorded in the selected characteristic data area 92. Then, data of an image modification pattern for Westerner 108b corresponding to the selected characteristic is selected and read out from the image modification pattern area 94. The image modification pattern for Westerner 108b is set with a change amount for addition of an average or typical westerner's features with which the face becomes more sharply-chiseled. Based on the data of the image modification pattern for Westerner 108b, the face image is subjected to image modification. The image data to be modified has been subjected to image modification with the image modification pattern 108 corresponding to the previously selected characteristic, and thus the modification here is merged with the previous modification.

As stated above, a plurality types of characteristics are selected by the user 100, a face image is modified and final image data is generated according to the plurality of selected characteristics. Then, a final modified face image 114 is displayed on the LCD 18 as shown in the lower portion of FIG. 6.

Therefore, by selecting characteristic(s) after photographing an image of a face, the user 100 can enjoy seeing the face image in which colors are modified corresponding to the characteristic(s). Besides, the final image modified with all the plurality of selected characteristics may be suddenly displayed and thus no individual image modified with each of the plurality of characteristics would be presented. Accordingly, the face image that has been modified with the plurality of characteristics from the actually photographed image 104 is abruptly displayed.

Figure 7:
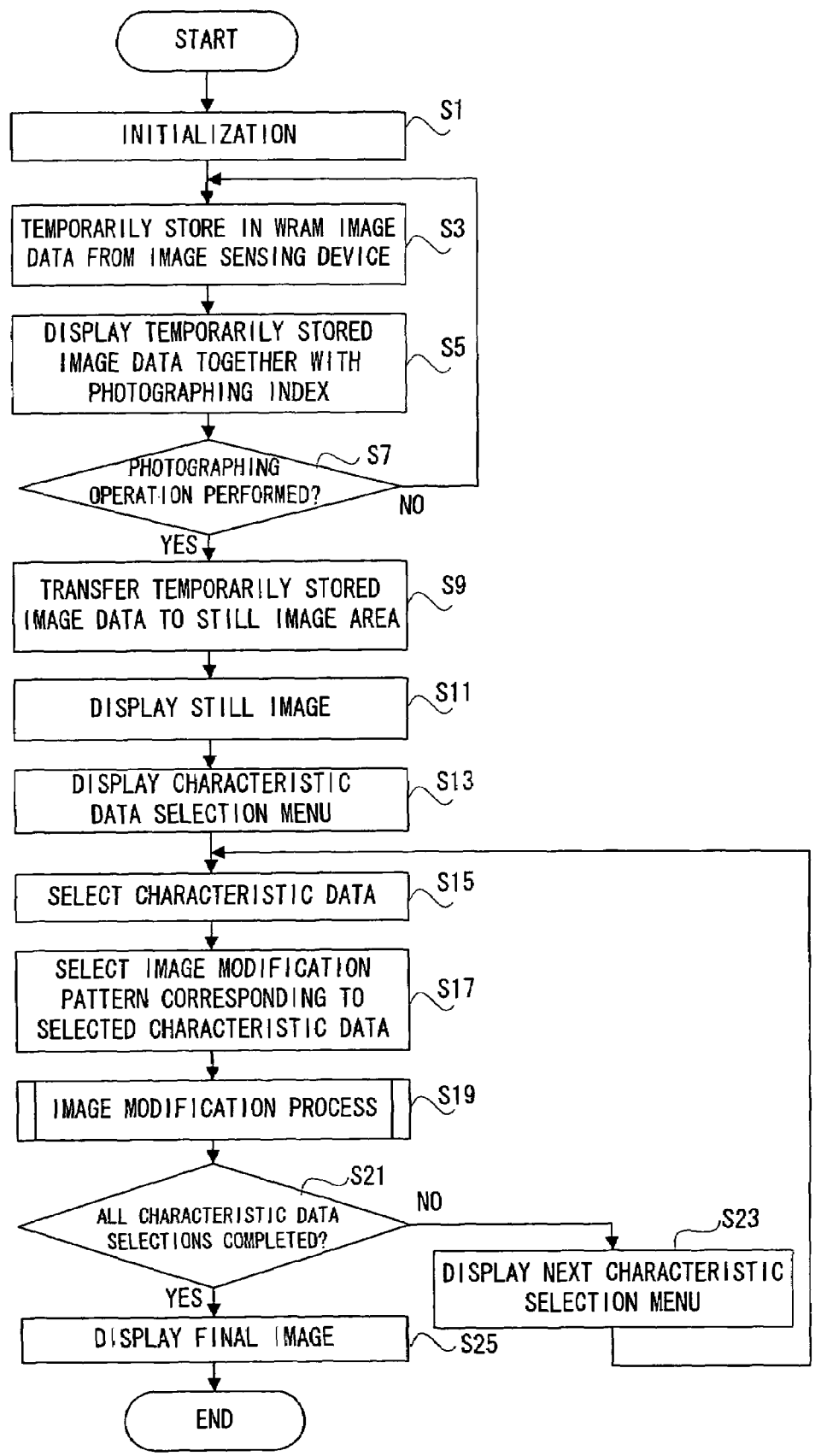
FIG. 7 is a flowchart showing one example of an operation of the image processing apparatus with image sensing capability from the FIG. 1 exemplary illustrative embodiment.

FIG. 7 shows one example of an operation of image sensing and image processing in the game apparatus 10. Firstly, in a step S1, the CPU 32 of the game apparatus 10 performs an initialization to clear each buffer area and set default values to various variables, flags, etc., for example. Next, in a step S3, the CPU 32 fetches image data from the image sensing unit 30 including the image sensing device and stores it temporarily in the image-sensed data buffer area 86. Then, in a step S5, the CPU 32 displays the temporarily stored image on the LCD 18 via the image processing unit 38, etc. It is noted that the photographing indexes 102 read from the photographing index data area 88 are displayed at prescribed positions on the LCD 18, as well as the image fetched from the image sensing unit 30.

Then, in a step S7, the CPU 32 determines whether or not any operation input data indicating a photographing operation exists, that is, a shutter operation from the operating switch 20. If "NO" in the step S7, that is, if no photographing operation has been performed, the CPU 32 returns to the step S3 to fetch new image-sensed data from the image sensing unit 30. Since a process from step S3 to step S7 is performed in a relatively short time, images are repeatedly fetched from the image sensing unit 30 and displayed in real time on the LCD 18 unless the user 100 performs a photographing operation with the L button 20d. Accordingly, the user 100 can shoot a photograph while checking the images displayed on the LCD 18.

On the other hand, if "YES" in the step S7, that is, if operation input indicating a photographing operation has been performed by the user 100, the CPU 32 transfers the image data temporarily stored in the image-sensed data buffer area 86 to the still image area 96 in a step S9. The CPU 32 then displays the still image (actually photographed image) 104 stored in the still image area 96 on the LCD 18 through the image processing unit 38, etc. in a step S11, and displays on the LCD 18 via the image processing unit 38, etc. the characteristic data selection menu 106 to be displayed that is stored in the characteristic data menu data area 90 in a step S13. In this way, the actually photographed image 104 and the age menu 106a are displayed on the LCD 18, as shown in the upper portion of FIG. 6, for example.

Subsequently, the CPU 32 executes a characteristic data selection process in a step S15. In the characteristic data selection menus 106, for example, if the action switch 20b is operated in a state where the cursor 112 is pointed at any option item, the CPU 32 determines that the characteristic data corresponding to the option item is selected and records it in the selected characteristic data area 92. In case of the upper portion of FIG. 6, for example, the age-related characteristic data indicating Senior is selected by the user 100.

After that, the CPU 32 selects an image modification pattern corresponding to the selected characteristic data from the image modification pattern area 94 in a step S17. In case of the upper portion of FIG. 6, the data of the image modification pattern for Senior 108a is selected.

Then, the CPU 32 executes an image modification process in a step S19. Descriptions of the image modification process will be given later with reference to FIG. 8. By execution of the image modification process, modifications based on the selected image modification pattern 108 are made to the still image.

The CPU 32 subsequently determines whether or not all the characteristic data selections have been completed in a step S21. That is, it is determined whether or not a predetermined number of characteristic data have all been selected.

If "NO" in the step S21, that is, if some characteristic data remains to be selected, the CPU 32 reads out the next characteristic selection menu 106 from the characteristic data selection menu data area 90 and displays it on the LCD 18 in a succeeding step S23. Thus, in the example shown in the middle portion of FIG. 6, the race menu 106b is displayed in addition to the photographed face still image 104. Then, the CPU 32 returns to the step S15 to repeat the process. More specifically, the CPU 32 selects characteristic data based on the operation of the user 100 with respect to the next characteristic data selection menu 106b, and performs an image modification based on the image modification pattern 108 corresponding to the selected characteristic. In this way, a process of the step S23 and steps S15 to S19 is repeated to provide image modifications depending on a plurality of characteristics until it is determined in the step S21 that all the characteristic data selections have been completed.

On the other hand, if "YES" in the step S21, the CPU 32 displays on the LCD 18 a final modified image stored in the still image area 96 of the WRAM 36, via the image processing unit 38, etc. Thus, the final face image 114 with a plurality of characteristics (Senior and Westerner in the FIG. 6 example) added, is displayed on the LCD 18 as shown in the lower portion of FIG. 6, for example.

Figure 8:
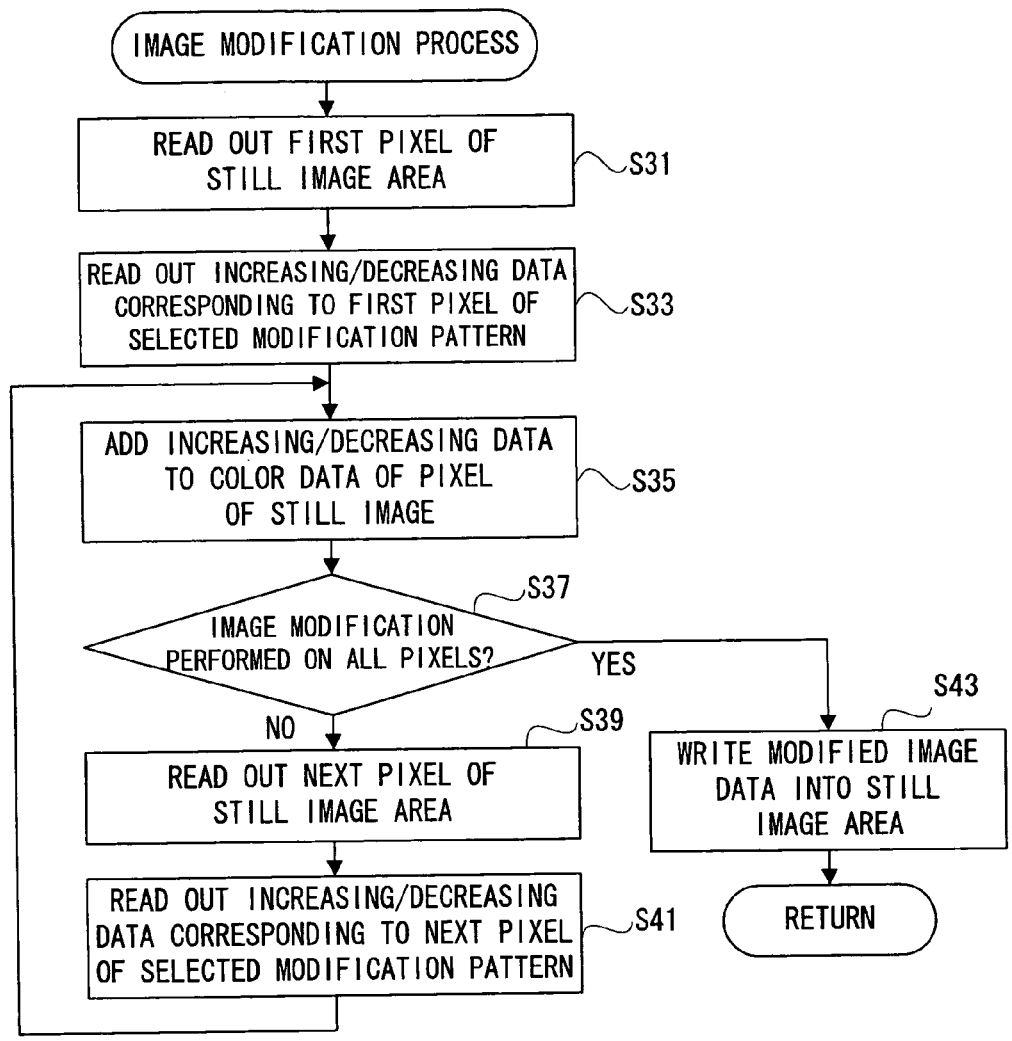
FIG. 8 is a flowchart showing one example of an image modification process in FIG. 7.

FIG. 8 shows one example of an operation of the image modification process in the step S19 of FIG. 7. In a first step S31 of FIG. 8, the CPU 32 reads color data of a first pixel of the image data stored in the still image area 96 into a prescribed area of the WRAM 36. Subsequently, the CPU 32 reads into a prescribed area of the WRAM 36 increasing/decreasing data (change amount) corresponding to the first pixel in the selected image modification pattern 108.

Then, the CPU 32 adds the increasing/decreasing data to the color data of the pixel of the still image in a step S35. With this, the color data of the photographed still image 104 or the previously modified still image is modified according to the increasing/decreasing data.

Subsequent to that, the CPU 32 determines in a step S37 whether or not image modifications have been performed on all the pixels of the still image. If "NO" in the step S37, the CPU 32 reads color data of a next pixel of the image data stored in the still image area 96 into the prescribed area of the WRAM 36 in a step S39. The CPU 32 then reads increasing/decreasing data corresponding to the next pixel in the selected image modification pattern 108 into the prescribed area of the WRAM 36 in a step S41.

Next, the CPU 32 returns to the step S35 to add the increasing/decreasing data to color data of the read pixel of the still image. In this way, color modifications are performed on all the pixels of the still image until "YES" is determined in the step S37. Then, if "YES" in the step S37, that is, modifications based on the image modification pattern 108 corresponding to the selected characteristic have been completed, the CPU 32 writes the modified image data into the still image area 96 in a succeeding step S43, and terminates the image modification process and returns to the step S21 of FIG. 7.

A photographed face image is modified in color, by the user 100 to select characteristic data, based on the image modification pattern(s) corresponding to the characteristic(s). This allows the face image to be modified with addition of the characteristic(s) in a simple and easy manner. For example, by selecting some characteristic(s) not belonging to the person of the photographed face, it is possible to perform an enjoyable face image modification, having fun with seeing how colors are changed. Additionally, preparation of some characteristic data beyond expectations of the user 100, for example, makes available a more amusing image processing process. Moreover, although the user 100 selects word(s) or the like expressing desired characteristic(s) from the menu, it is not clear how the image is specifically modified at a time of selection. Consequently, it is possible to increase the fun of image modifications with selected characteristic(s).

Furthermore, the image modification pattern 108 defining a relative increasing/decreasing amount of each pixel, is prepared for each of the plurality of characteristic data. Thus, color modifications can be performed by relative addition or subtraction of color data forming pixels without having to perform a complicated color modification program, which makes it possible to offer a color modification capability with a low operation burden.

In the image modification process of the described above, the completely modified image data is stored in the still image area 96. Or, it may be possible to save the photographed face image data as it is in the still image area 96 and store the modified image in another prescribed area of the WRAM 36. In this case, however, pixel data should be read from the storage area for the modified image in the step S31 and step S39.

Besides, in each of the above, each time some characteristic data is selected according to operation input by the user 100, the face image data is modified on the basis of the image modification pattern 108 corresponding to the selected characteristic data. It may be possible to, however, after selection of a plurality of characteristics, modify the face image data in one operation based on a plurality of image modification patterns 108 corresponding to the plurality of characteristics. In this case, it may also be possible to firstly merge the plurality of selected image modification patterns 108 and then modify the face image data based on the merged image modification pattern.

Also, in each of the above, the characteristic data selection menu 106 is supposed to be displayed to make the user 100 select characteristic(s) from the characteristic data selection menu 106. It may be possible to make the user 100 directly input some word(s) expressing a characteristic in text form. In this case, the image modification pattern 108 is selected corresponding to the input word(s). However, if no image modification pattern 108 is prepared for the entered characteristic, it is necessary to prompt the user 100 to input another characteristic by providing a warning display or the like.

Moreover, in each of the above, the game apparatus 10 including the handheld game machine 12 and the camera cartridge 14 is presented as one example of the image processing apparatus 10. As a matter of course, the form of the image processing apparatus may be changed as necessary, and it may be a camera-equipped mobile phone, camera-equipped portable information terminal or electronic camera. If the image processing apparatus 10 can be connected to a network such as the Internet, it may be possible to download the image processing programs and data from a server on the network into the memory within the apparatus 10, instead of storing them in advance in a ROM or HDD within the apparatus 10, a connectable external storage medium or the like.

Furthermore, in each of the above, descriptions are given as to a case where an image of a face is photographed and related characteristics such as age, race, gender, and body shape are added to the face image. However, a still image to be photographed is not limited to the face but can be changed as necessary. For example, it may be possible to photograph a landscape as a still image and add related characteristic(s) to the landscape image. Characteristics related to landscape could be time (e.g. morning, noon, evening and night), weather (e.g. foggy, rainy, cloudy and shiny), season (e.g. spring, summer, autumn and winter), etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus with image sensing capability and operable to receive user input comprising:
   an image sensor that photographs an image;
   a display that displays at least the image photographed by said image sensor;
   sensed-image temporary data storage that temporarily stores sensed-image data input from said image sensor;
   still image storage that stores the sensed-image data input from said image sensor as a still image;
   sensed-image saving programmed logic circuitry that saves the sensed-image data, stored in said sensed-image temporary data storage, to said still image storage when prescribed user input is performed;
   a displayed characteristic input selector that provides a user with the option to input at least one characteristic related to the still image;
   image modification pattern storage that stores a plurality of image modification pattern data containing a change amount associated with each pixel of the still image stored by said photographing programmed logic circuitry and for modifying color data of at least one pixel;
   image modification pattern selection programmed logic circuitry that selects at least one image modification pattern data corresponding to at least the one characteristic selected from the displayed characteristic input selector;
   image modification programmed logic circuitry that modifies color data of the still image stored in said still image storage based on at least the one image modification pattern data selected by said image modification pattern selection programmed logic circuitry; and
   modified image display programmed logic circuitry for displaying on said display the still image modified by said image modification programmed logic circuitry.

2. An image processing apparatus with image sensing capability according to claim 1 further including:
   characteristic data storage that stores a plurality of characteristic data related to said characteristic in advance, wherein
   said displayed characteristic input choice provides the user with the option to select a plurality of characteristic data from the characteristic data stored in said characteristic data storage;
   said image modification pattern selection programmed logic circuitry selects a plurality of image modification pattern data corresponding to the plurality of characteristic data selected from the displayed characteristic input selector;
   said image modification programmed logic circuitry modifies color data of said still image based on the plurality of image modification pattern data selected by said image modification pattern selection programmed logic circuitry; and
   said modified image display programmed logic circuitry displays a final still image modified by said image modification programmed logic circuitry based on all the plurality of image modification pattern data.

3. An image processing apparatus with image sensing capability according to claim 2, wherein
   said image modification pattern storage stores a plurality of image modification pattern data containing an increasing/decreasing value associated with all pixels of said still image and for relatively increasing or decreasing color data of the pixels, corresponding to all the plurality of characteristic data stored in said characteristic data storage.

4. An image processing apparatus with image sensing capability according to claim 2, wherein
   said displayed characteristic input selector provides the user with an option to select said characteristic data by selecting a word expressive of the characteristic.

5. A storage medium storing an image processing program for performing image processing in an image processing apparatus which is operable to receive user input and comprises at least an image sensor for photographing an image, a display for displaying the image photographed by said image sensor, program processing programmed logic circuitry, image data storage, and image modification pattern storage for storing a plurality of image modification pattern data containing a change amount associated with each pixel of data of the image photographed by said image sensor and for modifying color data of the pixel, wherein said image processing program causes a processor of said image processing apparatus to execute steps of:

temporarily storing sensed-image data, input from said image sensor, in said image data storage;

storing, as a still image, the sensed-image data stored by said sensed-image data temporary storing, in another area of said image data storage when prescribed user input is performed;

receiving the user input of at least one characteristic related to the still image;

selecting at least one image modification pattern data corresponding to at least the one characteristic input by said characteristic input step;

modifying color data of the still image stored in said image data storage, based on at least one image modification pattern data selected by said image modification pattern selection; and displaying on said display the still image modified by said image modification.

6. A storage medium storing an image processing program according to claim 5, wherein said image processing apparatus further includes characteristic data storage for storing a plurality of characteristic data related to said characteristic in advance, said allowing the user to input at least one characteristic allows the user select a plurality of characteristic data from the characteristic data stored in said characteristic data storage, said image modification pattern selection selects a plurality of image modification pattern data corresponding to the plurality of characteristic data selected by said allowing the user to input at least one characteristic, said image modification modifies color data of said still image based on the plurality of image modification pattern data selected by said image modification pattern selection, and said modified image displaying displays a final still image modified by said image modification based on all the plurality of image modification pattern data.

7. A method of image capture and modification comprising:

capturing an image with an image sensor;

displaying one or more user-selectable choices of characteristics to apply to the image;

determining which characteristics are selected by a user;

selecting stored patterns for image modification based on which characteristics are selected by the user;

modifying the captured image using the stored patterns that have been selected such that the image portrays one or more selected characteristics; and displaying the image portraying one or more selected characteristics, wherein said selecting further includes selecting stored patterns wherein said stored patterns contain a color data relative change amount associated with each pixel of said captured image and used to adjust the color data value of at least one pixel of said captured image.

8. The method of claim 7 further including providing at least one visual guide for helping a user properly align an image to be captured.

9. The method of claim 7 wherein the displaying one or more user-selectable choices of characteristics includes displaying one or more age-based characteristics.

10. The method of claim 7 wherein the displaying one or more user-selectable choices of characteristics includes displaying one or more race-based characteristics.

* * * * *